INVENTOR
NORMAN WHITEHOUSE
BY: Morris & Bateman
ATTYS

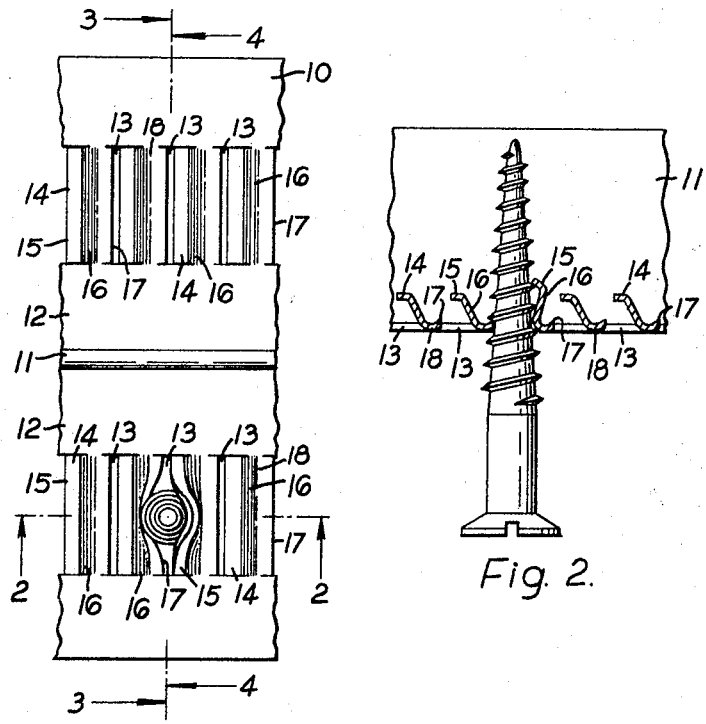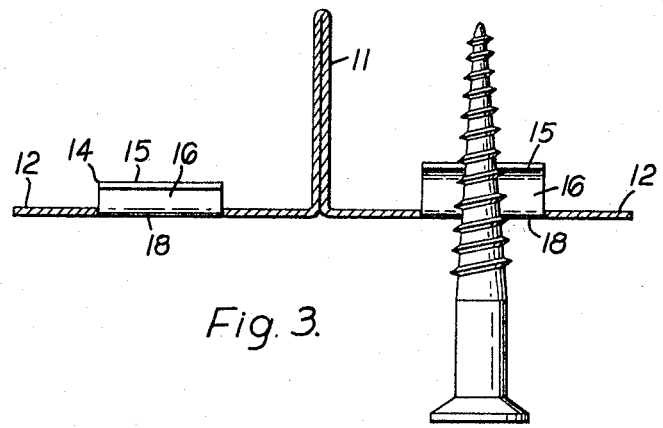

United States Patent Office 3,448,650
Patented June 10, 1969

3,448,650
SUPPORT MEMBERS FOR USE IN SUPPORTING PANELS
Norman Whitehouse, Solihull, England, assignor to George Whitehouse & Company (Birmingham) Limited, Birmingham, England
Filed Aug. 21, 1967, Ser. No. 661,890
Int. Cl. F16b 33/02, 37/02
U.S. Cl. 85—36                                8 Claims

ABSTRACT OF THE DISCLOSURE

A support member for use in supporting ceiling, wall or room partition panels, formed with a plurality of slots and having a deformable tongue projecting from one side of each slot so as at least partially to overlap the slot, said tongue and the opposite side of the slot having respective screw-engageable edges, which are spaced apart in a direction transverse to the plane containing the slot. This enables the edges to engage with different parts of the thread of a screw inserted in the slot with the screw extending perpendicular to the plane of the slot.

---

This invention relates to support members, for use in supporting ceiling, wall or room partition panels, the members being of the kind adapted for receiving screws, each at any one of several alternative positions, so as to permit anchorage of a panel to the member generally in any required position.

An object of this invention is to provide a support member of the above kind which may permit more accurate positioning of a panel as compared with known equivalent members.

In accordance with this invention, a support member of the kind referred to is formed with a plurality of slots, and has a pair of screw-engageable edges at respective opposite sides of each slot, at least one of the the edges being formed on a deformable tongue which at least partially overlaps the slot, the edges being spaced apart in a direction transverse to the plane containing the slot.

A typical example of the practical realisation of the invention, and modifications thereof, will now be particularly described with reference to the accompanying drawings, in which:

FIGURE 1 is a plan view of a portion of a support member;

FIGURES 2 to 4 are sectional views taken along the lines 2—2, 3—3 and 4—4 respectively in FIGURE 1.

Figure 4:
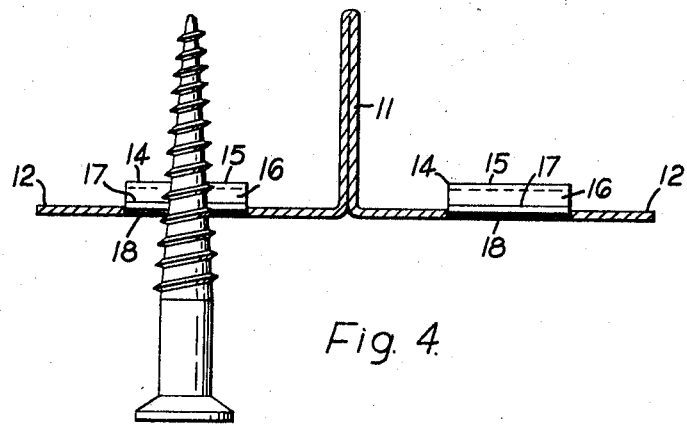

Referring initially to FIGURES 1 to 4, a support member 10 for a ceiling or wall panel comprises a strip of galvanised sheet metal which, in a rolling operation, is folded through 180° along its longitudinal centre line to provide a body 11 and has its longitudinal marginal portions bent outwardly to form oppositely extending coplanar flanges 12. Thus the cross-section of the member as seen in FIGURE 3 is of inverted T shape.

Each of the flanges 12 of the member 10 is formed with a row of parallel rectilinear slots 13, each slot extending perpendicularly to the length of the member 10 and occupying approximately half of the total width of its flange 12 in a central region thereof. The slots 13 are formed at the same time that the member 10 is rolled into its T shape, by severing the metal of the flange 12 to define one longitudinal and both lateral sides of each slot and by folding each resulting flap of metal along a line which defines the other longitudinal side of the respective slot. Each flap of metal is folded so as to project on the same side of its flange 12 as the body 11 and defines a tongue 14 partially overlapping the adjacent slot 13.

Each tongue 14 is generally of L-section, the shorter limb 15 of the L almost completely overlapping the associated slot 13 and lying generally parallel to the plane containing the slot 13. The shorter limb 15 of the L is spaced from the slot by the larger limb 16 of the L, as shown particularly in FIGURE 2. In severing the tongue 14 from the longitudinal side of the slot 13 an upstanding edge 17 is left projecting from that side on the same side of the flange as the tongue. The rolling operation also imparts a convexly curved cross-section to the metal strips 18 between adjacent slots 13, so as to act as leads towards the slots 13.

In the installation of, for example, a suspended ceiling, a number of the support members 10 are arranged to be used for supporting ceiling panels, and each panel is secured to the appropriate members 10 by self-tapping screws. Each screw can be inserted through the panel so that its tip is located in the region of one of the rows of slots 13 in one of the members 10 whereupon the screw tip will be led by the curvature of the nearest metal strip 18 into the closest one of the slots 13 and can be screwed through the slot.

It has been found experimentally that the tongue 14 of the slot 13 is deformed by passage of the screw through the slot so as barely to overlap the slot 13, and parts of screw threads are tapped into the edge 17, the other side of the slot 13, and into the free edge of the tongue 14 as shown in FIGURE 2, whereby an anchorage is formed by the screw so that it can assist in holding the panel in position. The different spacings of the edge 17 and the free edge of the tongue 14 from the slot 13 permits anchorage of the screw with its axis extending perpendicular to the plane of the slot 13, whereas if both edges were approximately equally spaced from the slot 13, the engagement of the edges with the helices of the screw would tend to force the screw to a position extending obliquely through the slot 13.

In addition, since the metal strips 18 between the slots 13 are narrow, the strips 18 can be readily bowed in the plane of the flange by entry of the screw therebetween to facilitate entry of the screw into the slot 13 and to assist in anchoring the screw therein.

Figure 5:
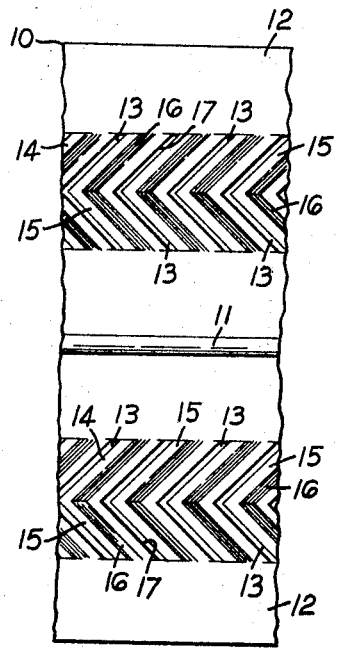
FIGURE 5 is a plan view of a portion of a modified support member.

In one modification of the above described example, each slot is positioned at an angle of approximately 45° to the length of the support member and in a second modification, illustrated in FIGURE 5, each slot is of chevron shape with the legs of each chevron at a mutual angle of 90° and at angles of 45° to the length of the support member.

The support member need not be of T shaped cross-section. For example, a support member designed for supporting wall panels may consist of a flat sheet of metal provided with slots and tongues and a support member designed for room partitions may be of channel shape.

I claim:

1. A support member for securing panels comprising a strip providing a planar face having a plurality of screw receiving slots formed therethrough to provide each slot with at least one margin offset out of said planar face and overlying the slot for deformable engagement with a screw, characterised in that said slots are arranged in a substantially equi-spaced series along said strip and at least one of said slot margins is of substantially L-section to define a screw-engageable edge presented towards another screw-engageable edge of the same slot in a direction substantially parallel to said planar face and offset from said other screw-engageable edge in a direction normal to said planar face.

2. A support member according to claim 1, wherein said other screw-engageable edge is offset from the planar face in the same direction as but to a lesser extent than the screw-engageable edge defined by said L-section margin.

3. A support member according to claim 1, wherein each slot has sides adjoining said planar face defining convex surfaces facing one another transversely of the slot and serving to lead a screw into the slot.

4. A support member according to claim 1, wherein a limb of said L-section margin remote from said planar face extends substantially parallel to said face and the connecting limb of said L-section margin is obliquely inclined from its root in the general plane of said strip towards the median plane of the associated slot.

5. A support member according to claim 1, wherein each slot extends transversely of the length of the strip with the series of slots arranged lengthwise of the strip.

6. A support member according to claim 5, wherein each slot is of chevron shape with each adjacent pair of slots overlapping one another transversely and lengthwise of the strip.

7. A support member according to claim 1, wherein said slots have margins of L-section all projecting on the same side of said planar face.

8. A support member for securing panels comprising a planar face having a plurality of slots pierced therethrough to provide each slot with at least one margin offset out of the planar face and overlying the slot for deformable engagement with a screw, characterised in that at least one of the slot margins is of L-section to define a screw-engageable edge presented towards another screw-engageable edge of the same slot in a direction parallel to the planar face and offset from said other screw-engageable edge in a direction normal to the planar face, said margin adjoining the planar face having a convex surface, and the opposite side of the slot adjoining the planar face having a convex surface with the convex surfaces facing one another transversely of the slot, said opposite side of the slot defining said other screw-engageable edge offset from the planar face in the same direction as but to a lesser extent than the screw-engageable edge defined by the L-section margin.

References Cited

UNITED STATES PATENTS

| 944,643 | 12/1909 | White | 85—36 |
| 2,859,930 | 11/1958 | Brunsting et al. | |

FOREIGN PATENTS

| 1,468,494 | 12/1966 | France. |
| 553,953 | 6/1943 | Great Britain. |
| 646,406 | 11/1950 | Great Britain. |

EDWARD C. ALLEN, *Primary Examiner.*